Patented Mar. 23, 1954

2,673,212

UNITED STATES PATENT OFFICE 2,673,212

PROCESS FOR PREPARING BETA-METHYL GLUTACONIC ACID ESTERS FROM ALKYL ISODEHYDROACETATES

De Walt S. Young and George F. Rodgers, Kingsport, Tenn., assignors to Eastman Kodak Company, Rochester, N. Y., a corporation of New Jersey No Drawing. Application January 29, 1952, Serial No. 268,932

7 Claims. (Cl. 260—485)

This invention relates to the preparation of beta-methyl glutaconic esters from isodehydroacetic acid esters whereby improved yields of the diesters are obtained by employing catalytic basic agents under substantially anhydrous conditions.

U. S. 2,218,032 dated October 15, 1940, describes the preparation of glutaconic acid employing propiolic acid in the presence of more than two molecular proportions of sodium hydroxide or some other alkaline material. No methyl-substituted glutaconic acid derivatives are disclosed.

U. S. 2,244,645 dated June 3, 1941, describes a process for the preparation of esters of methyl-substituted glutaconic acid such as the dimethyl ester of alpha, alpha, gamma-trimethyl glutaconic acid employing methyl methacrylate in the presence of a silica gel catalyst whereby the desired product is obtained and is said to be a dimer of methyl methacrylate. The dimerization is conducted in the vapor phase at a temperature of about 350° C.

Esters of beta-methyl glutaconic acid have been prepared in accordance with prior art descriptions in the literature of splitting the heterocyclic ring of isodehydroacetic acid esters in the presence of equimolecular quantities of a base such as sodium in alcohol solution whereby the heterocyclic ring is opened up and a yield of about 75 per cent of a mixture of the mono and diesters of beta-methyl glutaconic acid together with a by-product of high molecular weight have been obtained. The use of other such bases has also been described in the literature; however, their employment in catalytic quantities is neither described nor suggested. The results obtained when catalytic quantities in an excess of alcohol are employed are unexpectedly superior as pointed out hereinbelow.

We have now discovered an improved procedure whereby isodehydroacetic acid esters can be converted in esters of beta-methyl glutaconic acid with yields in general about 90 per cent and as high as 97.5 per cent under the optimum reaction conditions described below. According to out process an ester of isodehydroacetic acid is reacted or treated with a basic catalyst and an excess of a lower aliphatic alcohol at a moderately elevated temperature for a period of several hours under substantially anhydrous conditions whereby the desired product is obtained and can be separated and purified by distillation at reduced pressure.

It is an object of our invention to provide a remarkably improved method for preparing esters of beta-methyl glutaconic acid whereby high yields are obtained. It is an object of our invention to provide such a process wherein the reaction products contain insignificant quantities of by-products. An additional object of our invention is to avoid the formation of the acid ester since the diester of beta-methyl glutaconic acid is the product desired in certain organic processes as an intermediate in the preparation of other organic compounds. Our invention provides an unexpectedly simple process which is more economical as well as more practical than that described in the prior art. Further objects of our invention will become apparent hereinafter.

The esters of isodehydroacetic acid which can be employed in accordance with the process of our invention includes the lower alkyl (1 to 6 carbon atoms) esters such as the methyl, ethyl, n-propyl, etc. esters. Most advantageously we employ the ethyl ester of isodehydroacetic acid.

The basic catalysts which can be employed in accordance with the invention are bases or base-forming compounds. Advantageously the catalyst is an alkali metal or a derivative thereof such as an hydroxide, or alkoxide. Examples of catalysts which can be advantageously employed include sodium, potassium, sodium hydroxide, potassium hydroxide, sodium methoxide, potassium ethoxide, etc. Inasmuch as the reaction is conducted in a lower aliphatic alcohol solution, any of the alkali metal catalysts employed are converted into the corresponding alkoxide, depending upon the alcohol or alcohols that may be present.

The amount of catalyst employed can be as little as a small fraction of one per cent based on the weight of the isodehydroacetic acid ester. Higher percentages of the catalysts can also be employed. Advantageously the quantity of catalyst employed is from about 0.1 per cent to about 2 or 3 per cent. It is believed apparent that higher or lower percentages can also be employed. A quantity on the order of about one quarter per cent based on the weight of the isodehydroacetic acid ester is generally satisfactory.

The alcohols which can be employed include the lower alkyl (1 to 6 carbon atoms) alcohols such as methyl alcohol, ethyl alcohol, n-butyl alcohol, etc. The quantity of alcohol employed can be varied considerably. At least 2 mol proportions of alcohol theoretically are required for each mol proportion of the ester of isodehydroacetic acid. If ethyl isodehydroacetate is being converted to the diethyl ester of beta-methyl glutaconic acid, then 2 mols of ethyl alcohol is the minimum quantity of alcohol which should theoretically be employed; the theoretical reaction products obtained would be principally diethyl beta-methyl glutaconate and ethyl acetate. If methyl alcohol is being reacted with ethyl isodehydroacetate, the presence of not much more than 2 mol proportions of methyl alcohol results in the production of some mixed esters of beta-methyl glutaconic acid containing methyl and ethyl alcoholic constituents, whereas the employment of a large excess of methyl alcohol will result in the preparation of a product which is practically entirely the dimethyl ester of beta-methyl glutaconic acid. It is advantageous to employ a large excess of alcohol in order to produce a diester containing substantially only the alcohol substituent of the alcohol being employed. Advantageously from about 6 to about 20 mol proportions of alcohol are employed per mol proportion of the isodehydroacetic acid ester; such large excesses result in improved yields. Preferably from about 10 to 20 mol proportions of alcohol are employed.

In conducting the reaction, the various materials can be mixed together and heated for several hours at an elevated temperature of about 50° C. to reflux temperature in order to bring about the desired transformation. It is advantageous to dissolve the catalyst in the alcohol and then add the isodehydroacetic acid ester to the catalyst solution; however, other methods of mixing the materials can also be employed. It is advantageous to agitate the reaction mixture during the course of the reaction. The elevated temperature which is most advantageous is that at which reflux takes place. Under reflux conditions no additional agitation is required. Upon completion of the transformation, the solvent can be removed by evaporation and the product purified by distillation at reduced pressures.

The following examples will serve to further illustrate our invention:

Example 1

98 grams (1 mol proportion) of ethyl isodehydroacetate, 250 cc. (12.3 mol proportions) of methyl alcohol and 0.25 gram (about 0.25% by weight based on the ester) of sodium hydroxide were mixed and agitated under reflux for 10 hours. The solvent was removed by evaporation and consisted of a mixture which was principally methyl alcohol and methyl acetate. The remaining product consisting essentially of beta-methyl glutaconic dimethyl ester was purified by distillation at 12 mm. of Hg pressure and was collected over a total distillation range of 104-111° C. The purified product weighed 78.3 grams which represents a yield of 91 per cent.

The product of Example 1 was further purified by fractional distillation at reduced pressure to yield a colorless liquid which distilled at 109-111° C. under 12 mm. of Hg pressure. The diester prepared in accordance with Example 1 was also treated with aqueous alkali to saponify the diester followed by acidification whereby the geometrical isomer of beta-methyl glutaconic acid melting at 111-116° C. was obtained in a yield of 94 per cent calculated as beta-methyl glutaconic acid. Digestion with ether at room temperature raised the melting point to 113-116° C. As a further proof that the ester prepared in accordance with Example 1 was actually an ester of beta-methyl glutaconic acid, a known derivative was prepared by reaction with benzaldehyde followed by decarboxylation. The product which was beta-styryl crotonic acid had a melting point of 153-156° C. which corresponded with the melting point of this compound reported in the literature as being (a) 153° C., cf., Kohler and Heritage, American Chemical Journal 43, 487 and (b) 156-157° C., cf., Auwers, J. Pr. Chem. (2), 105, 380.

Example 2

0.4 gram of sodium (0.2% by weight based on the ester) was dissolved in 550 cc. (15.2 mols) of methyl alcohol and 196 grams (1 mol) of ethyl isodehydroacetate was added. The solution was refluxed for 2½ hours and allowed to stand overnight at room temperature. The solvent was then removed and the reaction product was distilled at 12 mm. of Hg pressure. Beta-methyl glutaconic acid dimethyl ester was collected in the fraction distilling between 110-117° C. and was a colorless liquid. This product weighed 168 grams which represents a 97.5 per cent yield.

Example 3

0.1 gram of sodium (0.1% by weight based on the ester) was dissolved in 100 grams (3.1 mols) of methyl alcohol and 98 grams (0.5 mol) of ethyl isodehydroacetate was added. The solution was refluxed for 2 hours and allowed to stand overnight at room temperature. The solvent was then removed and the reaction product was distilled at 12 mm. of Hg pressure. The product was a colorless liquid and was collected in the fraction distilling in the range of 111-120° C. This product weighed 78.2 grams, representing a yield of 91 per cent calculated as beta methyl glutaconic dimethyl ester.

The higher boiling range shown in the above example is indicative that, as discussed hereinbefore, a mol proportion of alcohol closer to the theoretical results in the formation of certain amounts of the mixed ester of beta methyl glutaconic acid. It will be understood that the formation of small quantities of the mixed ester is not objectionable in certain cases where the products of the reaction of our invention are used as intermediates in additional reactions without further separation or purification. For such intermediate uses it may be advantageous to employ as low as 3 mol proportions of alcohol per mol proportion of the isodehydroacetic acid ester; such excesses preserving relatively high yields while yet permitting economy in the use of alcohol where substantially complete conversion to the unmixed ester is not important.

The optimum reaction conditions for the operation of this invention result in very high yields as illustrated in the above examples. The use of sodium in anhydrous methyl alcohol or other lower alkyl alcohols as a catalyst enables the reaction to be completed as in Example 2 in from two to three hours, whereas with a catalyst such as sodium hydroxide in Example 1, somewhat longer reaction periods are required. If the alcohol employed is not essentially anhydrous, the active catalyst would be sodium hydroxide or other alkali metal hydroxide rather than the alkoxide.

The products obtained in accordance with this invention are probably mixtures of the isomers which can be designated as cis-beta-methyl glutaconic esters and trans-beta-methyl glutaconic esters or mixtures of these isomers. In addition to the examples given above, methyl isodehydroacetate can be reacted with propyl alcohol in a mol ratio of 20 of the alcohol to 1 of the isodehydroacetate in the presence of 0.4 per cent by weight of sodium dissolved in the alcohol whereby a high yield of the dipropyl ester of beta-methyl glutaconic acid can be obtained.

Similarly, n-butyl isodehydroacetate can be reacted with ethyl alcohol in a mol ratio of 1 of the ester to 10 of the alcohol in the presence of potassium hydroxide (0.3 per cent by weight based upon the isodehydroacetate) whereby a high yield of primarily the diethyl ester of beta-methyl glutaconic acid can be obtained.

The process of this invention results in the almost quantitative preparation of two readily marketable products, viz. a beta-methyl glutaconic ester and an alkyl acetate, which are both capable of isolation by a very simple procedure. In the examples given above, the alkyl acetate is methyl acetate which is capable of being reconverted to ethyl acetoacetate and thence to ethyl isodehydroacetate which can then be employed in the preparation of additional beta-methyl glutaconic acid esters. The prior art process did not enable the easy isolation of methyl acetate as a by-product. The beta-methyl glutaconic esters are useful and valuable intermediates in synthetic organic chemistry.

The employment of a large excess of the alcohol as compared with the prior art has no disadvantages inasmuch as the alcohol can be completely recovered, whereas simple and complete recovery of the alcohol in accordance with prior art was not feasible. Moreover, the prior art resulted in the production of an acid ester and a high molecular weight residue, neither of which were desirable.

It is therefore evident that the process of this invention makes possible the manufacture of beta-methyl glutaconic acid esters with greater economy of time and materials and with improved simplicity of operation as compared with any known prior art process.

What we claim as our invention and desire to secure by Letters Patent of the United States is:

1. In a condensation process for preparing alkyl diesters of beta-methyl glutaconic acid comprising mixing with agitation a lower alkyl isodehydroacetate and a lower aliphatic alcohol in the presence of a basic compound as a condensing agent, the improvements for facilitating the condensation whereby yields on the order of 90% or more are obtained comprising employing from about 0.1 to about 3 per cent based on the weight of the alkyl isodehydroacetate of a condensing agent selected from the group consisting of the alkali metals, the alkali metal hydroxides and the alkali metal lower alkoxides, performing the condensation by heating at a temperature of from about 50° C. to about the reflux temperature of the mixture being heated, employing substantially anhydrous conditions, and employing from about 6 to about 20 molecular proportions of the lower aliphatic alcohol in admixture with each molecular proportion of alkyl isodehydroacetate.

2. In a process as defined in claim 1, the employment of reflux conditions.

3. In a process as defined in claim 1, the employment of ethyl isodehydroacetate, methyl alcohol, and sodium.

4. In a process as defined in claim 1, the employment of ethyl isodehydroacetate, methyl alcohol, and sodium ethoxide.

5. In a process as defined in claim 1, the employment of ethyl isodehydroacetate, methyl alcohol, and sodium hydroxide.

6. In a process as defined in claim 1, the employment of ethyl isodehydroacetate, ethyl alcohol, and sodium.

7. In a process as defined in claim 1, the employment of methyl isodehydroacetate, methyl alcohol, and sodium.

DE WALT S. YOUNG.
GEORGE F. RODGERS.

References Cited in the file of this patent

Bland et al., J. Chem. Soc. (London), vol. 101, 1912, pp. 1565–6.